US012711760B2

(12) United States Patent
Baldwin et al.

(10) Patent No.: US 12,711,760 B2
(45) Date of Patent: Aug. 18, 2026

(54) METHODS AND SYSTEMS FOR USE IN PROCESSING IMAGES RELATED TO CROP PHENOLOGY

(71) Applicant: MONSANTO TECHNOLOGY LLC, Saint Louis, MO (US)

(72) Inventors: Steven Baldwin, Ellisville, MO (US); Robert Brauer, Lincoln, NE (US); Mohammad Alfi Hasan, Saint Louis, MO (US); Kyle Parmley, Ankeny, IA (US); Venkata Soumya Pisupati, Chesterfield, MO (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 483 days.

(21) Appl. No.: 17/956,655

(22) Filed: Sep. 29, 2022

(65) Prior Publication Data

US 2023/0093903 A1 Mar. 30, 2023

Related U.S. Application Data

(60) Provisional application No. 63/250,615, filed on Sep. 30, 2021.

(51) Int. Cl.
*G06V 20/10* (2022.01)
*G06V 10/72* (2022.01)
*G06V 10/774* (2022.01)

(52) U.S. Cl.
CPC ............ *G06V 20/188* (2022.01); *G06V 10/72* (2022.01); *G06V 10/774* (2022.01)

(58) Field of Classification Search
CPC ...... G06V 20/188; G06V 20/13; G06V 20/17; G06V 10/82
See application file for complete search history.

(56) References Cited

U.S. PATENT DOCUMENTS

2012/0250962 A1 10/2012 Scharf et al.
2015/0071528 A1* 3/2015 Marchisio .............. G06F 16/29 382/159

(Continued)

FOREIGN PATENT DOCUMENTS

CN 111179172 A 5/2020

OTHER PUBLICATIONS

Birla. "Single Image Super Resolution Using GANS—Keras," In: medium.com, Nov 8, 2018, 9 pgs.

(Continued)

*Primary Examiner* — Emily C Terrell
*Assistant Examiner* — Jacqueline R Zak
(74) *Attorney, Agent, or Firm* — Harness, Dickey & Pierce, P.L.C.

(57) ABSTRACT

Systems and methods are provided for use in processing image data of crops associated with one or more plots. One example computer-implemented method includes accessing a data set including images associated with one or more plots. The method then includes, for each plot, comparing a first index value of a first image of the plot at time n to an index value of a second image of the plot at time n+1; in response to the second index value being greater than the first index value, flagging the second image; and modifying the data set by removing at least part of the second image based on the flag. The method further includes accessing phenotypic data for the one or more plots at a time consistent with the images and training a model based on data including the modified data set and the accessed phenotypic data.

15 Claims, 7 Drawing Sheets

(56) References Cited

U.S. PATENT DOCUMENTS

| | | | |
|---|---|---|---|
| 2016/0171680 A1 | 6/2016 | Lobell | |
| 2018/0189564 A1* | 7/2018 | Freitag | G06F 18/214 |
| 2018/0211156 A1 | 7/2018 | Guan et al. | |
| 2020/0074605 A1* | 3/2020 | Goyal | G06T 5/73 |
| 2020/0125929 A1 | 4/2020 | Guo et al. | |
| 2020/0342226 A1 | 10/2020 | Bengtson et al. | |
| 2021/0012109 A1 | 1/2021 | Chou et al. | |
| 2021/0153500 A1 | 5/2021 | Kuenzi | |
| 2021/0158527 A1* | 5/2021 | Logie | G06T 7/0016 |
| 2021/0201024 A1 | 7/2021 | Lin et al. | |
| 2021/0247313 A1* | 8/2021 | Ogawa | G01N 21/84 |
| 2021/0286998 A1 | 9/2021 | Wilson et al. | |
| 2021/0312591 A1 | 10/2021 | Ren et al. | |
| 2021/0397836 A1 | 12/2021 | Li et al. | |
| 2022/0198221 A1 | 6/2022 | Avegliano et al. | |
| 2022/0210975 A1* | 7/2022 | Digman | A01F 15/00 |
| 2022/0217894 A1 | 7/2022 | Guo et al. | |
| 2022/0327815 A1 | 10/2022 | Picon Ruiz et al. | |
| 2022/0335715 A1 | 10/2022 | Geach et al. | |
| 2022/0391613 A1* | 12/2022 | Wolfson | G06V 20/13 |

OTHER PUBLICATIONS

Shendryk et al. "Integrating satellite imagery and environmental data to predict field-level cane and sugar yields in Australia using machine learning." In: Field Crops Research, vol. 260. Jan. 1, 2021, 13 pgs.

Mai et al. "Batch Inverse-Variance Weighting: Deep Heteroscedastic Regression." In: arXiv; Jul. 9, 2021, 15 pgs.

Kulkarni et al. "Semantic Segmentation of Medium-Resolution Satellite Imagery using Conditional Generative Adversarial Networks"; AI for Earth Sciences Workshop at NeurIP 2020; 7 pgs.

Isola et al. "Image-to-Image Translation with Conditional Adversarial Networks"; Berkeley AI Research (BAIR) Laboratory, UC Berkeley; Nov. 26, 2018; 17 pgs.

Kwak et al. "Two-stage Deep Learning Model with LSTM-based Autoencoder and CNN for Crop Classification Using Multitemporal Remote Sensing Images." In: Korean Journal of Remote Sensing, vol. 37, No. 4, 2021; Aug. 23, 2021;13 pages.

Tenreiro et al. "Using NDV1 for the assessment of canopy cover in agricultural crops within modelling research." In: Computers and Electronics in Agriculture 182 (2021), Feb. 22, 2021;12 pages.

U.S. Appl. No. 17/956,119, filed Sep. 29, 2022, Brauer et al.

U.S. Appl. No. 17/956,679, filed Sep. 29, 2022, Brauer et al.

PCT International Search Report and Written Opinion of PCT Patent Application No. PCT/US2022/045182, dated Feb. 3, 2023. PCT/US2022/045182 has the same inventors and the same Applicant, Monsanto Technology LLC, as the instant application and may include subject matter in common with the instant application.

PCT International Search Report and Written Opinion (10 pages) of PCT Patent Application No. PCT/US2022/045266, dated Feb. 1, 2023. PCT/US2022/045266 has the same inventors and the same Applicant, Monsanto Technology LLC, as the instant application and may include subject matter in common with the instant application.

Machefer, M.; Lemarchand, F.; Bonnefond, V.; Hitchins, A.; Sidiropoulos, P. Mask R-CNN Refitting Strategy for Plant Counting and Sizing in UAV Imagery. Remote Sens. 2020, 12, 3015. https://doi.org/10.3390/rs12183015 (Year: 2020), 23 pages.

Ellinger, Understanding Spatial Resolution with Drones, TLT Photography, 2017 (Year: 2017), 8 pages.

Roman et al., Noise Estimation for Generative Diffusion Models, arXiv, 9.12.2021 (Year: 2021), 11 pages.

Gandikota et al., RTC-GAN Real-Time Classification of Satellite Imagery Using Deep Generative Adversarial Networks With Infused Spectral Information, IEEE, 2020 (Year: 2020), 4 pages.

Jiang et al., Gan-Based Multi-Level Mapping Network for Satellite Imagery Super-Resolution, IEEE, 2019 (Year: 2019), 6 pages.

Liu et al., Psgan a Generative Adversarial Network for Remote Sensing Image Pan-Sharpening, IEEE, 2018 (Year: 2018), 5 pages.

Xiuliang Jin et al., "High-Throughput Estimation of Crop Traits: A Review of Ground and Aerial Phenotyping Platforms", IEEE Geoscience and Remote Sensing Magazine, Jul. 1, 2020, pp. 200-231.

Rohith et al., "Effectiveness of Super-Resolution Technique on Vegetation Indices", IEEE, Jul. 2, 2021, 31 pages.

Van Klompenburg et al., "Crop Yield Prediction Using Machine Learning; A Systematic Literature Review", Computers and Electronics in Agriculture, Aug. 18, 2020, 18 pages.

Haoying Li et al., "SRDiff: Single Image Super-Resolution with Diffusion Probabilistic Models", arxiv.org, May 18, 2021, 9 Pages.

Matsushita et al., "Sensitivity of the Enhanced Vegetation Index (EVI) and Normalized Difference Vegetation Index (NDVI) to Topographic Effects: A Case Study in High-Density Cypress Forest", Sensors, Nov. 5, 2007, 16 Pages.

De Benedetto et al., "Field Partition by Proximal and Remote Sensing Data Fusion", Biosystems Engineering, Special Issue: Sensing in Agriculture, Feb. 23, 2013, 12 Pages.

* cited by examiner

METHODS AND SYSTEMS FOR USE IN PROCESSING IMAGES RELATED TO CROP PHENOLOGY

CROSS-REFERENCE TO RELATED APPLICATION

This application claims the benefit of, and priority to, U.S. Provisional Patent Application No. 63/250,615 filed Sep. 30, 2021, the entire disclosure of which is incorporated herein by reference.

FIELD

The present disclosure generally relates to methods and systems for use in processing images related to, and/or in connection with determining (e.g., predicting, forecasting, etc.), phenotypic expression(s) in crops.

BACKGROUND

This section provides background information related to the present disclosure which is not necessarily prior art.

Crops are planted, grown and harvested in and from fields located in various different regions. After planting the crops, depending on types of the crops, the crops follow a progression through different growth stages until harvest. For example, the different growth stages may include germination, leaf visibility, heading, flowering, etc., each of which vary by particular types of crops, locations of fields in which the crops are growing, etc. In connection with crop analysis, it is known for individuals to enter the fields, or plots, and assess the growth stage(s) of the crops based on both visual and analytical techniques. And, the growth stage(s), as determined by the individuals, for the various crops may then be aggregated to provide data, which may be analyzed to determine, plot or estimate growth progression of the crops in the region.

Separately, images of fields are known to be captured in various manners, including, for example, by satellites, unmanned and manned aerial vehicles, etc. In connection therewith, the images are further known to be analyzed to determine, for example, characteristics of crops in the fields.

SUMMARY

This section provides a general summary of the disclosure, and is not a comprehensive disclosure of its full scope or all of its features.

Example embodiments of the present disclosure generally relate to computer-implemented methods for use in processing image data associated with one or more plots. One example computer-implemented method generally includes accessing, by a computing device, a data set, the data set including images associated with one or more plots, the images having a spatial resolution of about one inch per pixel; and then for each plot: (i) comparing, by the computing device, a first normalized difference vegetation index (NDVI) value of a first image of the plot at time n from the data set to a second NDVI value of a second image of the plot at time n+1 from the data set; (ii) in response to the second NDVI value being greater than the first NDVI value, flagging, by the computing device, the second image; and (iii) modifying, by the computing device, the data set by removing at least part of the second image, based on the second image being flagged, from the data set. The method further includes accessing phenotypic data for the one or more plots, at a time consistent with the images associated with the one or more plots; training a model, based on data including the modified data set, for the one or more plots, and the accessed phenotypic data, whereby weights of the model are fitted to said data; and storing, by the computing device, the trained model in memory.

Example embodiments of the present disclosure also generally relate to non-transitory computer-readable storage media including executable instructions for processing image data. In one example embodiment, such a non-transitory computer-readable storage medium includes executable instructions, which when executed by at least one processor, cause the at least one processor to: (a) access a data set, the data set including images associated with one or more plots, the images having a spatial resolution of about one inch per pixel; (b) for each plot: (i) compare a first normalized difference vegetation index (NDVI) value of a first image of the plot at time n from the data set to a second NDVI value of a second image of the plot at time n+1 from the data set; (ii) in response to the second NDVI value being greater than the first NDVI value, flag the second image; and (iii) modify the data set by removing at least part of the second image, based on the second image being flagged, from the data set; (c) access phenotypic data for the one or more plots, at a time consistent with the images associated with the one or more plots; (d) train a model, based on data including the modified data set, for the one or more plots, and the accessed phenotypic data, whereby weights of the model are fitted to said data; and (e) store the trained model in memory.

Example embodiments of the present disclosure also generally relate to systems for use in processing image data associated with one or more plots. In one example embodiment, such a system generally includes a computing device configured to: (a) access a data set, the data set including images associated with one or more plots, the images having a spatial resolution of about one inch per pixel; (b) for each plot: (i) compare a first normalized difference vegetation index (NDVI) value of a first image of the plot at time n from the data set to a second NDVI value of a second image of the plot at time n+1 from the data set; (ii) in response to the second NDVI value being greater than the first NDVI value, flag the second image; and (iii) modify the data set by removing at least part of the second image, based on the second image being flagged, from the data set; (c) access phenotypic data for the one or more plots, at a time consistent with the images associated with the one or more plots; (d) train a model, based on data including the modified data set, for the one or more plots, and the accessed phenotypic data, whereby weights of the model are fitted to said data; and (e) store the trained model in memory.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, are not all possible implementations, and are not intended to limit the scope of the present disclosure.

Figure 1:
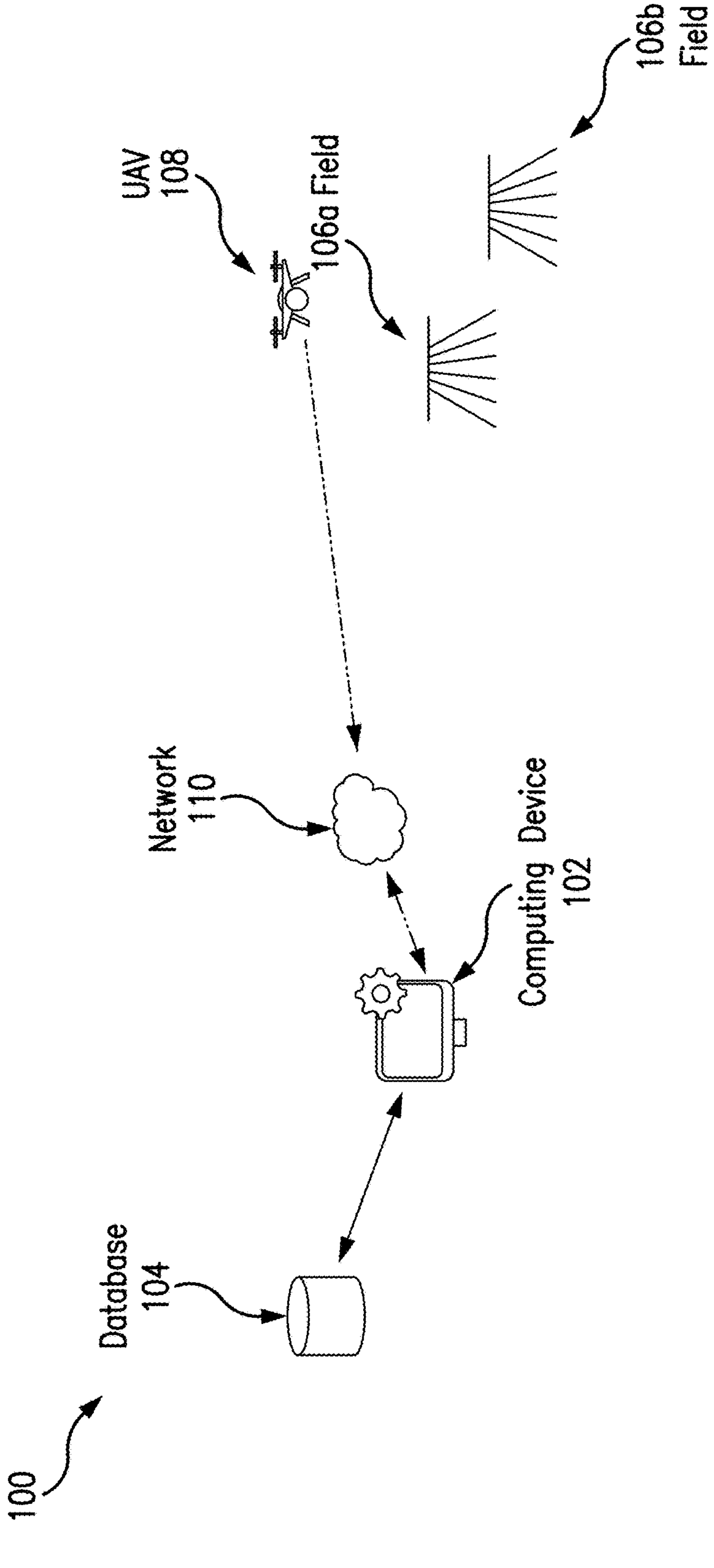
FIG. 1 illustrates an example system of the present disclosure configured for training and using a model to predict phenotypic data for fields (e.g., plots in the fields, etc.), and/or for crops in the fields (or associated with the fields), based on image data for the fields (or plots) and/or crops.
Figure 4:
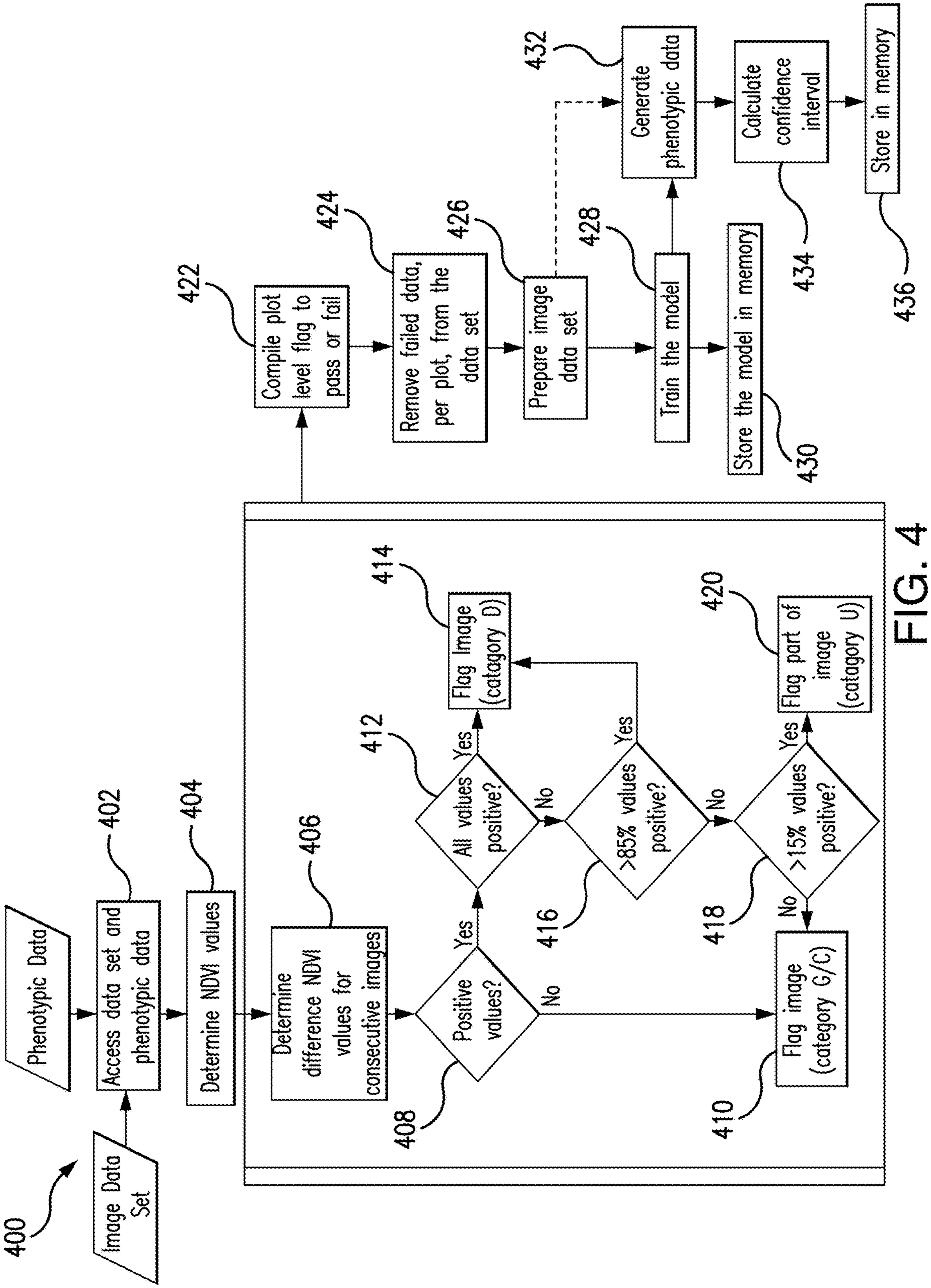

FIG. 4 illustrates a flow diagram of an example method, which may be used in (or implemented in) the system of FIG. 1, for use in processing image data for fields (or plots) and/or crops in the fields (or in the plots) and then employing the processed data, in combination with other data relating to the fields (or plots) and/or crops, to train a model in connection with predicting phenotypic data for the fields (or plots) and/or crops (and/or for subsequent fields, plots, and/or crops);

FIGS. 5A-5D illustrate graphical representations of example images and phenotypic data associated with training of the model in the method of FIG. 4 (and/or with training of the model in the system of FIG. 1), and associated predicted example phenotypic data; and FIGS. 6A-6D illustrate graphical representations of example performance metrics associated with the model trained in connection with the method of FIG. 4 (and/or with the model trained in connection with the system of FIG. 1).

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

As crops grow in different fields (or plots), maturities of the crops advance until harvest, when the crops are then removed from the fields. The harvest, and other milestones for the crops (e.g., where the milestones may include reaching particular growth stages, reaching particular times for treatment applications (e.g., pesticides, insecticides, herbicides, etc.), etc.), are generally dependent on the phenotypic traits, classifications, characteristics, etc. (all broadly, phenotypic data) associated with the crops. For example, a harvest date for a crop may be determined based on a moisture content of the crop, etc. In general, phenotypic data is typically manually gathered by individuals in the fields, through visual observations and/or manual testing of the crops. The resources expended to gather such data, manually, are often excessive. And, by relying on the individuals, such data collection can also be variable or inconsistent across different individuals. The present disclosure realizes the need for alternate mechanisms of determining or collecting phenotypic data for fields and/or crops in the fields, which leverage technical and/or automated aspects to provide accuracy and consistency in such data collection and phenotypic determinations.

Uniquely, the systems and methods herein provide for collecting and/or determining phenotypic data for fields and/or crops in the fields, based on imagery of the fields and/or crops, rather than manual inspection of the fields and/or crops. In particular, image data is collected for both check plots and test plots (e.g., as part of or within fields including crops, etc.), where the image data for check plots includes phenotypic data for crops in the check plots (available for reference, confirmation, etc. of the crops in the images) (e.g., manually measured phenotypic data, historical phenotypic data, etc.). The data from the check plots is then employed to train a model to determine phenotypic data for the crops in the check plots from the image data, and the model is then used to determine the phenotypic data for crops in the test plots based on the image data for the test plots. In this manner, phenotypic data is gained through an alternate, technical means across various different plots, which provides for increases in efficiency, accuracy and consistency in connection with subsequently determining or predicting phenotypic data for crops in fields.

FIG. 1 illustrates an example system 100 in which one or more aspects of the present disclosure may be implemented. Although the system 100 is presented in one arrangement, other embodiments may include the parts of the system 100 (or additional parts) arranged otherwise depending on, for example, sources and/or types of image data, arrangement of fields, types of image capture devices, types of crops in the fields, etc.

In the example embodiment of FIG. 1, the system 100 generally includes a computing device 102 and a database 104, which is coupled to (and/or otherwise in communication with) the computing device 102, as indicated by the arrowed line. The computing device 102 is illustrated as separate from the database 104 in FIG. 1, but it should be appreciated that the database 104 may be included, in whole or in part, in the computing device 102 in other system embodiments.

The system 100 also includes multiple fields 106*a-b*. The fields 106*a-b*, in general, are provided for planting, growing and harvesting crops, etc., in connection with farming, for example. While only two fields 106*a-b* are shown in the system 100, it should be appreciated that another number of fields may be included in other embodiments, including, for example, dozens, hundreds or thousands of fields, covering several acres (e.g., 1 acre, 10 acres, 50 acres, 100 acres, 200 acres, 1000 acres, or more or less, etc.). It should also be understood that fields may be used herein to refer to any growing spaces, in general, which is exposed for aerial imaging regardless of size, etc.

The fields 106*a-b* may also define one or more plots (e.g., geographically, etc.), which may be any suitable size (e.g., two meters by 30 meters, etc.). In connection therewith, the plot sizes may be specific to crops, tests, experiments, regions, etc. Often, the fields 106*a-b* each include multiple plots. For example, the field 106*a* may include three different corn hybrids, where the area in which each of the hybrids is planted defines a different plot within the field 106*a*. That said, each of the fields 106*a-b* generally includes more than one plot. For example, the field 106*a* may include ten or more plots, while the field 106*b* may include five or more plots, etc. Stated another way, a plot is generally a smaller area of land, as compared to a field (although this is not required in all implementations of the present disclosure, for example, as in some implementations a plot may include an entire field or multiple fields, etc.). That said, as an example (and without limitation), a plot included in a field may have a size ranging from about 0.5 meters to about 5 meters in width and/or a size ranging from about 1 meter to about 10 meters in length. Plots may have different sizes in other embodiments, for example, widths that are less than about 0.5 meters, widths that are greater than about 5 meters, lengths that are less than about 1 meter, lengths that are greater than about 10 meters, etc.

In this example embodiment, the fields 106*a-b* may be populated with one or more crops (or plants) as desired by a grower or farmer associated therewith. The crops (or plants) may include, for example (and without limitation), corn (or maize), wheat, beans (e.g., soybeans, etc.), peppers, tomatoes, tobacco, eggplant, corn or maize, rice, rye, sorghum, sunflower, potatoes, cotton, sweet potato, coffee, coconut, pineapple, citrus trees, prunes, cocoa, banana, avocado, fig, guava, mango, olive, papaya, cashew, almond, sugar beets, sugarcane, oats, barley, vegetables, or other suitable crops or products or combinations thereof, etc. In addition, the fields 106*a-c* may each include the same type of plants/crops, or a number of different varieties of the same type of plants (or crops), or different types of plants/crops. For example, field 106*a* may include a first hybrid maize plant, while field 106*b* may include a second, different hybrid maize plant. Alternatively, the field 106*a* may include a third, different hybrid maize plant, while the field 106*b* may include a first hybrid soybean plant, etc. It should be appreciated that the fields 106*a-b* (and other fields in the system 100) may be located in proximity to one another, or not.

As further shown in FIG. 1, the system 100 includes an image capture device 108, which, in this example, includes an unmanned aerial vehicle (UAV), etc. While only one image capture device 108 is illustrated in FIG. 1, for purposes of simplicity, it should be appreciated that the system 100 may include (and in several implementations will include) multiple such image capture devices. What's more, the image capture device 108 is not limited to the UAV, whereby the system 100 may include one or more additional alternate image capture devices (e.g., satellites, manned aerial vehicles (MAVs), etc.). In one embodiment, the system 100 may include at least one satellite (as an image captured device), and then may also include (or may also be configured to implement) the image processing techniques described in Applicant's U.S. patent application Ser. No. 17/956,119, filed Sep. 29, 2022, which is incorporated herein by reference, for generating images for use as described herein.

In particular in the illustrated system 100, the UAV 108 (broadly, an image capture device) is configured to navigate to one or more fields, including the fields 106*a-b*, and to capture images to the fields (including plots in the fields, crops in the fields and/or plots, etc.). The UAV 108 is further configured to transmit the images to the database 104 (either directly, or via the computing device 102), whereby the database 104 is configured to receive and store the images. An image from the UAV 108 may be referred to herein as a UAV image, where the spatial resolution may be, for example, without limitation, less than about 1 inch, or about 35 millimeters, per pixel, or more or less depending on the particular UAV 108, etc. The temporal resolution for the UAV images may be one per year, twice per year, one per month, etc., depending on the operation of the UAV 110, the frequency of the UAV coverage of the fields 106*a-b*, etc.

Also in the illustrated system 100, the UAV 108 is configured as a multispectral sensor, whereby the UAV is configured to collect (e.g., in connection with obtaining images of the fields, plots, crops, etc.) radiometric reflection data, for example, in red (R), green (G), blue (B), and near infrared (NIR) regions of the electromagnetic spectrum, etc. (broadly, spectral data). In other embodiments, the UAV 108 may be configured to collect additional or other spectral data, for example, as may be used herein (e.g., in connection with determining features representative of image data of crops, etc.)

Based on the above, the database 104 includes a data set of images, which includes numerous UAV images of various fields, including the fields 106*a-b*, etc., captured by the UAV 108 (and captured by other image capture devices in the system 100, etc.). The data set may also include the radiometric reflection data captured by the UAV 108 for the fields (and/or the plots and/or the crops in the fields). The data set, including the UAV images and radiometric data, may be organized by location(s) of the images and/or by date/time of capture of the image(s), etc., as is suitable for the use as described herein. It should be appreciated that the image data may include more or less data depending on, for example, the particular image capture device used in capturing the specific images, etc., or potentially, processing of the images to reduce or enhance the data included in the image, etc.

In the illustrated system 100, the image data (e.g., as captured by the UAV 108, as included in the data set in the database 104, etc.) further includes a fifth feature. In particular, in this example embodiment, the image data herein further includes a normalized difference vegetation index (NDVI) for the UAV images. In connection therewith, the NDVI includes (or represents) a combination of the captured NIR and red data for the given field, plot, crop, etc. in a captured image, where the combination is based on (or is consistent with) Equation (1) below. It should be appreciated that the computing device 102 may be configured to determine the NDVI value, or the NDVI value may be calculated by another device and stored in the database 104 with the UAV images (e.g., as part of the data set of images, etc.), etc.

$$NDVI = \frac{NIR - \text{Red}}{NIR + \text{Red}} \tag{1}$$

Figure 2:
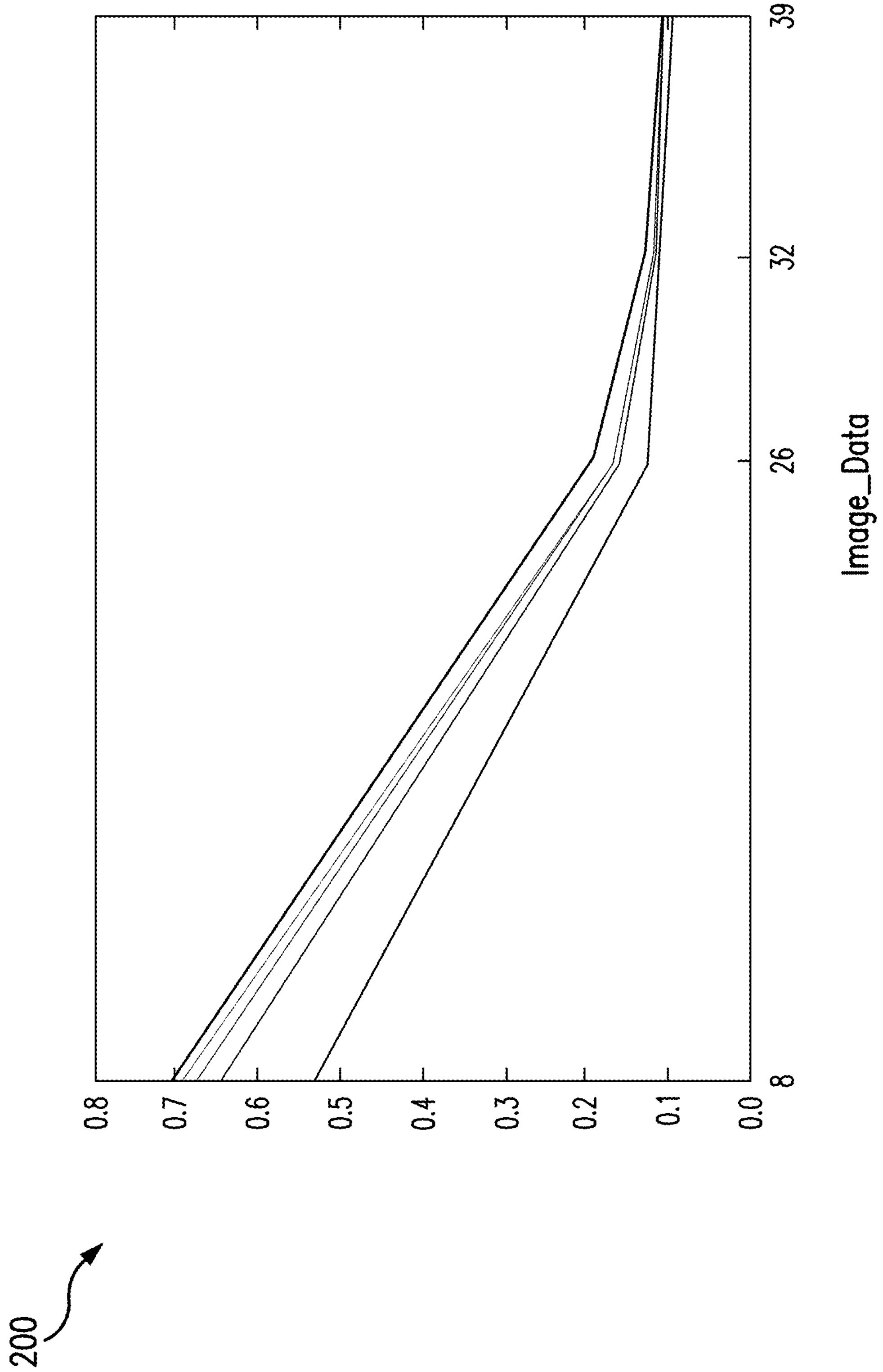
FIG. 2 illustrates an example graph representative of normalized difference vegetation index (NDVI) values for different crops (or plots) over time.

The NDVI ranges from −1.0 to 1.0 and generally represents green (or greenness) associated with the image(s). In connection therewith, the NDVI is also a measure of a state of plant/crop health based on how the plant/crop reflects light at certain frequencies. For example, as a plant matures, the plant generally absorbs more NIR light rather than reflecting it. Thus, changes in reflectance of NIR light relative to red light, for example, may provide an indication of the presence of maturity. As such, as the plant matures, the NDVI value decreases or falls from growth onward and approaches zero. This is generally illustrated in FIG. 2. In particular, FIG. 2 illustrates the NDVI values for various different plots of crops/plants for consecutive images dates (e.g., in days, etc.) for the plots. As shown, the NDVI values fall generally at a first rate from image date 0 until about image date 26, and then continue to fall at generally a second rate (slower than the first rate) until about image date 39. Based thereon, the NDVI values may be used to filter images (e.g., the UAV images in the data set of images in the database 104, etc.), or parts of the images, as anomalies, for example, when the NDVI values over time for the images are inconsistent with the graph shown in FIG. 2, or where the NDVI values for the images generally fail to decrease over time, etc.

That said, while NDVI is described herein as a feature of image data, it should be appreciated that indices other than the NDVI may be utilized in other embodiments, for instance, as a representative of the image data. For instance, the enhanced vegetation index (EVI) may be used/implemented as a feature of image data herein, the atmospherically resistant vegetation index (ARVI) may be used/implemented as a feature image data herein, etc. More generally, it should be appreciated that any spectral data and/or any combination of spectral data may be used herein as a feature representative of image data of crops.

In connection with the above, the computing device 102 is configured to determine (or predict or forecast, etc.) phenotypic data (e.g., phenotypic traits, classifications, characteristics, etc. of crops/plants; etc.) for one or more plots (e.g., for crops included in the plot(s), for crops included in the fields 106*a-b* where the fields 106*a-b* include one or more of the plots, etc.) based on images (and corresponding image data) associated with (or of) the plots.

In particular, the computing device 102 is configured to predict the phenotypic data based on a model, which is trained, as described herein. More specifically, the computing device 102 is configured to pre-process the images in the image data sets included in the database 104 for one or more plots, and then build a model from the pre-processed data to predict or forecast the phenotypic data for crops in the images. In pre-processing of the images, the computing device 102 is configured generally to perform quality assurance and quality control (QAQC) operations to filter data anomalies in (or from) the image data, prior to proceeding to later operations.

In one example of such pre-processing, for a given data set of images in the data structure 104 (e.g., for a given training data set of images, etc.), the computing device 102 is configured to identify unexpected patterns in the image data for the images (e.g., in the multispectral data, etc.) across time at a pixel level, a plot level and/or a field level, etc. Specifically, the computing device 102 is configured to identify an increase (e.g., at a pixel level, etc.) in the NDVI over time (e.g., between consecutive dates, etc.) per plot (based on the images of the plot over the time), for example, and, when a percentage of identified increases exceeds a threshold (for a given image), the computing device 102 is configured to flag the image(s) for the plot as having a bad date for the image(s), etc. and to remove the bad data/images from the data set. That is, when the percent of identified increase in the NDVI of a given image of a plot is more than, for example, 50% or 65%, or 85% (or more or less) of over a previous image of the plot, the given image is defined as including or involving an unexpected pattern. The unexpected pattern may be indicative of a bad date, for example, during which an atmospheric condition (e.g., clouds, precipitation, etc.), etc. may have impeded or otherwise affected the given image of the plot.

It should be appreciated that the computing device 102 may be configured to determine such unexpected patterns for the image as a segment smaller than a plot or greater than a plot (e.g., at a field level, or at a data set level, etc.), and then remove the part of the image from the data set (while retaining other parts of the image, etc.). In this manner, the computing device 102 may be configured to remove parts of images from the data set identified to the unexpected pattern, while preserving others.

Following the above, the computing device 102 is configured to combine images for the plots, fields, crops, etc., and/or other segments of the images, etc., and output the resulting data set of images as a test set of images, along with an indication for the test set of images as to which images or segments thereof passed the QAQC operations imposed by the computing device 102.

As generally described above, the data set(s) of images included in the database 104 is/are combined, in the database 104, with phenotypic data for the crops, plots, fields, etc. represented by the images in the data set(s) (e.g., including the training data set of images pre-processed as described above, etc.). The phenotypic data is gathered, in general, manually or by automation, often distinct from the images captured for the crops, plots, fields, etc. by the UAV 108 (and/or by other image capture devices). The phenotypic data is entered into the database 104, for example, by a mobile device or other computing device (not shown) carried by and/or accessible to an individual(s) in the plot(s) collecting and entering the data phenotypic data. Other suitable mechanisms may be employed to collect and store the phenotypic data in the database 104, for example, in various embodiments.

Next in the system 100, the computing device 102 is configured to aggregate the image data in the output data set (e.g., in the test set of images, etc.). In particular, in this embodiment, the spectral data (e.g., the R, G, B, NIR, NDVI, etc. data) for each image is averaged, or otherwise combined. For example, for each image, the R data is averaged across the image, and the G data is averaged across the image. As a result, the image data for each image is condensed into a vector, per image, which includes each of the combined values, per spectrum. In addition, the computing device 102 may be configured to append a value for a NDVI difference to the vector for each image, where the value includes the difference between the NDVI average of the image, and the NDVI average of a prior image in time (e.g., an immediately prior image in time, etc.). The computing device 102 is configured to then combine the vectors for the dates of the images in the data set, to form a matrix of data representative of the data set for each plot over time (e.g., multiple different matrices for multiple plots, etc.).

In turn, the computing device 102 is configured to combine the image data (e.g., the matrix of data, etc.) for the data set with relative maturity data for the plot(s), and to generate a model based thereon. In this example embodiment, the computing device 102 is configured to generate the model using a time-series data modeling technique, such as, for example, random forest regression, etc. More specifically, the model is generated, by the computing device 102, where the random forest learns the underlying relationship between the image data and the relative maturity data, and fits weights of the model accordingly. To that end, the model may be associated with one or more weights and values that can be determined and/or manipulated, for example, as appropriate to function as described herein (as would generally be apparent to one skilled in the art in view of the present disclosure). Other suitable modeling techniques may include bagging, boosting, XGBoost, AdaBoost, etc.

The model, then, is generated and is configured to predict or forecast relative maturity of desired plot(s) (e.g., the crops growing in the plot, etc.).

In addition to generating the model, the computing device 102 also is configured to generate confidence intervals in the model performance. In doing so, the confidence intervals provide feedback (e.g., validation, etc.) as to performance of the generated model and resulting phenotypic determinations, etc. (and/or as to relative performance among multiple generated models (e.g., where different models may be generated for different plots in fields, for different fields, etc.), etc. The confidence interval, in this example, is expressed as a z-score, according to Equation (2), below.

$$(\min, \max) = X \pm Z\frac{s}{\sqrt{n}} \tag{2}$$

In Equation (2), X is a predicted relative maturity (RM), n is a number of observations (e.g., 500, etc.), s is a standard deviation among the prediction outputs by each tree in the random forest, and Z is a fixed value (e.g., 1.440 for 85% confidence, 1.645 for 90% confidence, etc.).

The computing device 102 is configured to then store the generated model in memory and, as indicated above, to employ the model to forecast RM (broadly, phenotypic data), for example, for crops in one or more plots/fields based on images of the plots/fields (e.g., for test sets of images pre-processed consistent with the above, etc.). The forecasted phenotypic data may then be employed by users, growers, farmers, etc., to make decisions about actions related to the crops in the plots/fields, including, but not limited to, timing for the application of treatments (e.g., herbicides, pesticides, insecticides, etc.), timing of harvest, etc.

Figure 3:
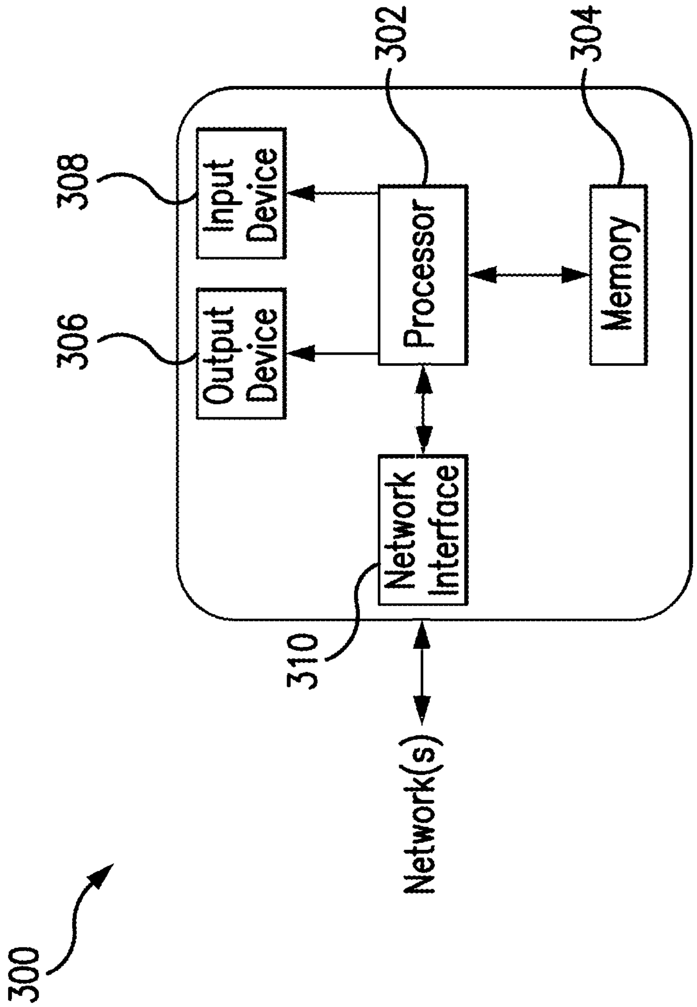
FIG. 3 is a block diagram of an example computing device that may be used in the system of FIG. 1.

FIG. 3 illustrates an example computing device 300 that may be used in the system 100 of FIG. 1. The computing device 300 may include, for example, one or more servers, workstations, personal computers, laptops, tablets, smartphones, virtual devices, etc. In addition, the computing device 300 may include a single computing device, or it may include multiple computing devices located in close proximity or distributed over a geographic region, so long as the computing devices are specifically configured to operate as described herein. In the example embodiment of FIG. 1, the computing device 102 includes and/or is implemented in one or more computing devices consistent with computing device 300. The database 104 may also be understood to include and/or be implemented in one or more computing devices, at least partially consistent with the computing device 300. However, the system 100 should not be considered to be limited to the computing device 300, as described below, as different computing devices and/or arrangements of computing devices may be used. In addition, different components and/or arrangements of components may be used in other computing devices.

As shown in FIG. 3, the example computing device 300 includes a processor 302 and a memory 304 coupled to (and in communication with) the processor 302. The processor 302 may include one or more processing units (e.g., in a multi-core configuration, etc.). For example, the processor 302 may include, without limitation, a central processing unit (CPU), a microcontroller, a reduced instruction set computer (RISC) processor, a graphics processing unit (GPU), an application specific integrated circuit (ASIC), a programmable logic device (PLD), a gate array, and/or any other circuit or processor capable of the functions described herein.

The memory 304, as described herein, is one or more devices that permit data, instructions, etc., to be stored therein and retrieved therefrom. In connection therewith, the memory 304 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media for storing such data, instructions, etc. In particular herein, the memory 304 is configured to store data including, without limitation, images (e.g., UAV images, etc.), data sets, models, vectors, confidence intervals, phenotypic data, and/or other types of data (and/or data structures) suitable for use as described herein. Furthermore, in various embodiments, computer-executable instructions may be stored in the memory 304 for execution by the processor 302 to cause the processor 302 to perform one or more of the operations described herein (e.g., one or more of the operations of method 400, etc.) in connection with the various different parts of the system 100, such that the memory 304 is a physical, tangible, and non-transitory computer readable storage media. Such instructions often improve the efficiencies and/or performance of the processor 302 that is performing one or more of the various operations herein, whereby such performance may transform the computing device 300 into a special-purpose computing device. It should be appreciated that the memory 304 may include a variety of different memories, each implemented in connection with one or more of the functions or processes described herein.

In the example embodiment, the computing device 300 also includes a output device 306 that is coupled to (and is in communication with) the processor 302 (e.g., a presentation unit, etc.). The output device 306 may output information (e.g., RMs, other phenotypic data, etc.), visually or otherwise, to a user of the computing device 300, such as a researcher, grower, etc. It should be further appreciated that various interfaces (e.g., as defined by network-based applications, websites, etc.) may be displayed or otherwise output at computing device 300, and in particular at output device 306, to display, present, etc. certain information to the user. The output device 306 may include, without limitation, a liquid crystal display (LCD), a light-emitting diode (LED) display, an organic LED (OLED) display, an "electronic ink" display, speakers, a printer, etc. In some embodiments, the output device 306 may include multiple devices. Additionally or alternatively, the output device 306 may include printing capability, enabling the computing device 300 to print text, images, and the like on paper and/or other similar media.

In addition, the computing device 300 includes an input device 308 that receives inputs from the user (i.e., user inputs) such as, for example, selections of crops, plots, images, desired characteristics, etc. The input device 308 may include a single input device or multiple input devices. The input device 308 is coupled to (and is in communication with) the processor 302 and may include, for example, one or more of a keyboard, a pointing device, a touch sensitive panel, or other suitable user input devices. It should be appreciated that in at least one embodiment the input device 308 may be integrated and/or included with the output device 306 (e.g., a touchscreen display, etc.).

Further, the illustrated computing device 300 also includes a network interface 310 coupled to (and in communication with) the processor 302 and the memory 304. The network interface 310 may include, without limitation, a wired network adapter, a wireless network adapter, a mobile network adapter, or other device capable of communicating to one or more different networks (e.g., one or more of a local area network (LAN), a wide area network (WAN) (e.g., the Internet, etc.), a mobile network, a virtual network, and/or another suitable public and/or private network, etc.) capable of supporting wired and/or wireless communication between the computing device 300 and other computing devices, including with other computing devices used as described herein (e.g., between the computing device 102, the database 104, mobile devices or other computing devices used by individuals in fields to provide phenotypic data, etc.).

FIG. 4 illustrates an example method 400 for predicting or forecasting crop characteristics based on images of the plots in which the crops are planted. The example method 400 is described herein in connection with the system 100, and may be implemented, in whole or in part, in the computing device 102 of the system 100. Further, for purposes of illustration, the example method 400 is also described with reference to the computing device 300 of FIG. 3. However, it should be appreciated that the method 400, or other methods described herein, are not limited to the system 100 or the computing device 300. And, conversely, the systems, data structures, and the computing devices described herein are not limited to the example method 400.

At the outset, it should be appreciated that the database 104 includes a data set (e.g., a training data set, etc.), which includes multiple images of a plot (or of various plots within a field, etc.) (and crops planted in or included in the various plots) (e.g., for images of plots as captured by the UAV 108, etc.). As indicated, the images are generally at a plot level of a given field (e.g., each image generally includes a plot of a field, or multiple plots for a given field (where plot boundaries are known), etc.) and are generally assigned to a data set based thereon. However, it should be appreciated that the images may include multiple plots (whereby the images may be assigned to a data set based on a field in which the multiple plots are located, based on one of the plots, etc.), or they may include less than a plot (e.g., a portion or fraction of a plot, etc.). In the method 400, the data set of images are used to train a model for predicting or forecasting crop characteristics of crops in fields.

That said, the images in the data set (in the database 104) define a sufficient spatial and temporal resolution. For example, the spatial resolution of the images may be about one foot by about one foot or less per pixel (e.g., six inches by about six inches per pixel, about one inch by about one inch per pixel, about 0.4 inches by about 0.4 inches per pixel, etc.). In connection therewith, the images may be captured, for example, via the UAV 108 (whereby the captured images have sufficient spatial resolution), or they may be captured otherwise (e.g., via one or more manned aerial vehicles (MAVs), satellites, etc.) and converted to have a suitable spatial resolution (e.g., about one foot by about one foot or less per pixel, etc.). Further, as for the temporal resolution, the data set may include one image per plot, daily, bi-weekly, weekly, or other suitable temporal interval (regular or irregular), etc. For instance, in one example embodiment, the temporal resolution for images in a data set may be based on (or may take into account) bio-events (e.g., growth events or growth stages, emergence of certain phenotypic traits, etc.) associated with a crop captured in the images (e.g., a crop included in the plot associated with the images, etc.). The temporal resolution for the images may also take into account climate (e.g., thermal time, etc.), as the climate may affect the bio-events. In such an embodiment, the data set may include images captured at particular growth events of the crop, for example, planting, emergence, flowering, onset of maturity, etc., whereby the given temporal interval for the images in the data set is generally tuned to growth activity of the crop. More generally, the temporal resolution of images in a data set may be configured (or tuned, etc.) to capture variation of a germplasm over time (whereby the appropriate temporal resolution may be regular or irregular, daily, weekly, biweekly, more frequent, less frequent, etc. depending on a state of the germplasm, etc.).

In addition, it should be understood that the data set in the database 104 includes individual images of the plot(s), which are represented, in this example, by spectral data of the pixels in the images, expressed as red, green, blue, and (NIR) (e.g., as [R, G, B, NIR], etc.). For example, each pixel may be represented by a vector indicative of the specific color of the pixel (e.g., [255,255,255, 255] is indicative of white, etc.).

Further, the database 104 includes phenotypic data for the crops identified in the images in the data set, for use in training a model, as described herein. It should be appreciated that the phenotypic data may include, without limitation, relative maturities for the crops and/or plot depicted in the images in the data set over time, yield, moisture content, disease progression, etc. In general, the phenotypic data in the database 104 is consistent with the phenotypic data that the model is being built to predict and/or forecast, etc.

With reference to FIG. 4, initially in the method 400, in training the model, the computing device 102 accesses, at 402, the data set of images in the database 104 described above (e.g., the training data set of images, etc.). The data set may be accessed in total (e.g., all images in the data set may be accessed, etc.) or in part (e.g., less than all images in the data set may be accessed, etc.). For example, the computing device 102 may access all images in the data set specific to a particular plot, such as, for example, a plot included in the field 106*a*, and exclude other images in the data set for other plots, etc. The computing device 102 also accesses, at 402, the phenotypic data associated with the image data set. Again, the computing device 102 may access the phenotypic data in total or in part (e.g., by plot, location, etc.), for example, corresponding to the images accessed, etc. In one particular example, the computing device 102 may access all images for a given plot (e.g., an image data set for a given plot, etc.), and then may also access the phenotypic data associated with the image data set for the given plot (whereby the plot may be a check plot, etc.).

Next, the computing device 102 determines, at 404, in this particular example, the NDVI values/data for the accessed images of the data set (again, at the given plot level). Each of the NDVI values is determined from Equation (1), provided above, based on the red and NIR data included in the accessed images. It should be appreciated that when the NDVI values for the images are already included in the data set (or other already determined), step 404 in method 400 may be omitted. That said, as indicated above, other indices, or more generally, other image data (or other combinations of image data) (e.g., R, G, B, NIR, or any suitable combinations thereof, etc.), etc., may be used in other embodiments in place of, or in addition to, NDVI. Simply stated, the present disclosure (including the method 400) should not be understood to be limited to NDVI.

The computing device 102 then determines, at 406, for each consecutive (in time) pair of the accessed images from the data stet (again, at the plot level in this example), a difference between the NDVI values for the images (generally, for example, at a pixel level of the images, etc.). In particular, each NDVI value for the image at time n+1 is subtracted from the corresponding NDVI value for the image, of the same plot, at time n. As described above, the NDVI values for the given plot, field, crop, etc. are expected to decrease over time. As such, for each consecutive (in time) pair of accessed images, the computing device 102 determines, at 408, whether the determined difference in NDVI values is positive, thereby indicating an increase in the NDVI values for the given time period represented by the pair of consecutive images (which would be inconsistent with the target NDVI trend, etc. described above and illustrated in FIG. 2).

To that end, when none of the differences between the NDVI values for consecutive ones of the accessed images is positive, the computing device 102, at 410, flags (or tags, or identifies, etc.) each of the accessed images as good, whereby a category of G or Good (or a check mark, etc.) is assigned to each of the images.

Conversely, when at least one of the determined differences in NDVI values for consecutive ones of the accessed images is positive, the computing device 102 then further determines, at 412, whether all of the determined differences in NDVI values for the accessed images (e.g., on a pixel level, etc.) are positive. When all the differences in NDVI values are positive for the accessed images, the computing device 102 flags, at 414, each of the images as bad, whereby a category of D or bad date is assigned to each of the images. This is generally indicative of interference with the image capture, for example, resulting from an issue with the UAV 108, etc., whereby the images are not indicative of the given plot or are not indicative of the given plot at the time/date associated with the images (whereby the time/date may be incorrect), etc.

When the differences in NDVI values for the accessed images are not all positive (again, for example, at the pixel level), the computing device 102 then determines, at 416, whether a threshold percentage of the differences are positive. In particular, in this example, the computing device 102 determines whether about 85% or more of the NDVI differences show a positive value. When the percentage of positive differences in NDVI values for the accessed images is greater than 85%, the computing device 102 flags, at 414, each of the images involved as bad, whereby a category of D or bad date is again assigned to the images (e.g., suggesting again that a time/date assigned to one or both of the images may be incorrect, etc.). Conversely, when the percentage of positive differences is less than 85%, the computing device 102 then determines, at 418, whether a second threshold percentage of the differences are positive. In particular, in this example, the computing device 102 determine whether 15% or more of the differences show a positive value. When the percentage of positive differences is greater than 15%, the computing device 102 flags, at 420, parts of the images with the positive differences as bad, whereby a category of U or bad check (or unsatisfactory) is assigned to the images. This is generally indicative of interference with the image capture, for example, from an atmospheric and/or weather condition (e.g., cloud, precipitation, etc.) (or potentially, an issue with the UAV 108, for example), whereby the images may or may not be indicative of the plot or field.

And, when the percentage of positive differences in the NDVI values for the images is less than 15%, the computing device 102 flags, at 410, the image as generally good, and assigns a category of C or caution to the image. Here, the images may still be used (e.g., maintained in the data set, etc.) but the caution indicator is provided so that users are aware that at least some of the NDVI values exhibited positive differences.

The computing device 102 continues in the quality assurance and quality check described herein (e.g., including steps 406-420, etc.) until each of the accessed images (for a given data set, for a given plot, etc.), or parts of the accessed images, has been flagged and assigned to a category. Thereafter, the computing device 102 compiles, at 422, the plot-level flag indicative of either pass or fail. In particular, the plot-level flag is based on a combination of the flags and categories assigned to the images of the plot (e.g., as included in the data set, etc.). When the images fail (e.g., flagged with a D (or bad date, etc.), the associated data is removed, at 424, per plot from the data set (broadly, the data set is modified). And, the remaining images in the data set, as modified, then, proceed to the model training. In one example embodiment, only images flagged with a G (or good) are maintained in the given data set. In another example embodiment, images flagged with either a G (or good). or a C (or caution) are maintained in the given data set. In a further embodiment, images flagged with a G (or good), a C (or caution), and a U (or unsatisfactory portions) are maintained in the given data set, with the images flagged with a U then being modified to include only portions of the images that exhibited negative changes in NDVI values.

First, in connection with the model training, the image data set is prepared, at 426, for the training. In particular, the computing device 102 groups available checks (e.g., available manually measured phenotypic data, available historical phenotypic data, etc.) in the field by their linecodes (e.g., by their unique germplasms, etc.). The spectral values for all the repetitions for a linecode across the data set are averaged for a given imaging date. This process is repeated for each image date to provide a representative spectral value for each date for, in this example embodiment, the R, G, B, NIR and NDVI regions of the electromagnetic spectrum. For example, for 'm' spectral values captured for each image and 'n' image dates, the computing device 102 prepares a vector of length m*n for each linecode.

In addition, in this example embodiment, the computing device 102 also includes an NDVI delta (e.g., on a pixel level, on an image level, etc.), which is the difference between the NDVI value of the image and the NDVI value of a prior (or a next) image (e.g., $NDVI_n - NDVI_{n-1}$, etc.). The NDVI delta is included with the other data describe above, whereby the linecode is represented by a feature vector of length [(m*n)+(n−1)].

Once the feature vectors are formed for every linecode, the computing device 102 collates the feature vectors, as part of preparing the image data, into a data structure, which is specific to the plots at specific times The phenotypic data for the image data is also added into the data structure. The above is repeated for each of the plots/fields in the modified data set, at each time for which image data and phenotypic data is available.

With continued reference to FIG. 4, the method 400 includes training the model with the created data structures, at 428. As indicated above, the computing device 102, in this example embodiment, relies on a time-series based Random Forrest based regression model, where the Random Forest provides a non-linear, non-parametric, decision tree-based ensemble machine learning algorithm. In connection therewith, the Random Forest learns the underlying relationships between the spectral values or the senescence patterns for the linecode and their respective phenotypic data, and then fits the model weights accordingly. Again, it should be appreciated that other learning model may be used in other embodiment, including, for example, bagging, boosting, XGBoost, or AdaBoost learning models, etc.

In one example, the model includes a Random Forrest model as illustrated, for example, at Equation (3).

$$\overline{r_n}(X, \mathcal{D}_n) = \mathbb{E}_{\Theta}[r_n(X, \Theta, \mathcal{D}_n)] \quad (3)$$

In general, Equation (3) provides for a collection (or combination) of randomized base regression trees, where $r_n$ may represent a trait of interest (e.g., relative maturity (RM) in the above example, etc.), X may represent a parameter of an image data set, and $D_n$ may represent the image data set. Then in Equation (3), $E_{\Theta}$ may represent an expectation with respect to Θ (e.g., NDVI, etc.), conditionally on the parameter of the data set (X) and the data set itself ($D_n$). In connection therewith, there may be two groups of input variables (features) for training: (1) features derived from the image data (e.g., mean values for R, G, B, NIR, and NDVI as each measured at a given time point, etc.) (2) known phenotypic values (e.g., RM for check plots, etc.) (e.g., based on existence of plots with high confidence data to enable such analysis, etc.). Together, these two groups of input variables generally comprise the training data and, thus, generally represent the input features for the model training (with RM, for example, then provided as the output from the model). That said, it should be appreciated that the input variables may include any desired type of imagery or suitable data.

In connection therewith, the Random Forest may be set up in any suitable fashion. For example, the Random Forest may include: a maximum depth of the tree is 20; a number of features to consider when looking for the best split is a square of the number of the features; a minimum number of samples required to be at a leaf node is 1; a number of trees in the forest is 1000; and/or bootstrap samples used when building trees in the model, etc. It should be appreciated that the above parameters may be modified, or otherwise, in other method embodiments, to provide for accurate and/or effective modeling of the specific image data and phenotypic data (e.g., without overtraining, etc.), etc.

After the model is trained, the computing device 102 stores, at 430, the trained model in memory (e.g., memory 304, etc.), for example, in the database 104, etc., for later use in forecasting phenotypic data.

After generating the model, in this embodiment, the computing device 102 also generates, at 432, phenotypic data based on the model, and based on a subset of the training data set (e.g., based on the image data from the training data set, and not the phenotypic data, for certain check plots; etc.). The computing device 102 then compares the generated phenotypic data to the known phenotypic data in the training set, and generates, at 434, confidence intervals in the model performance based thereon. In doing so, the confidence intervals provide feedback (e.g., validation, etc.) as to the performance of the model in generating the phenotypic data. The confidence intervals, in this example, are expressed as z-scores, according to Equation (2) above. The confidence intervals, then, are stored in memory (e.g., memory 304, etc.), at 436, for example, in the database 104, etc., for later use. For instance, the stored confident intervals may be linked to and/or associated with the respective models with which they are associated (or based on which they are generated), for the specific plots, in the memory, whereby the confidence interval(s) are retrieved with the model, when used, to provide an indication of the confidence in the later generated phenotypic data.

Figures 5A, 5B, 5C, 5D:
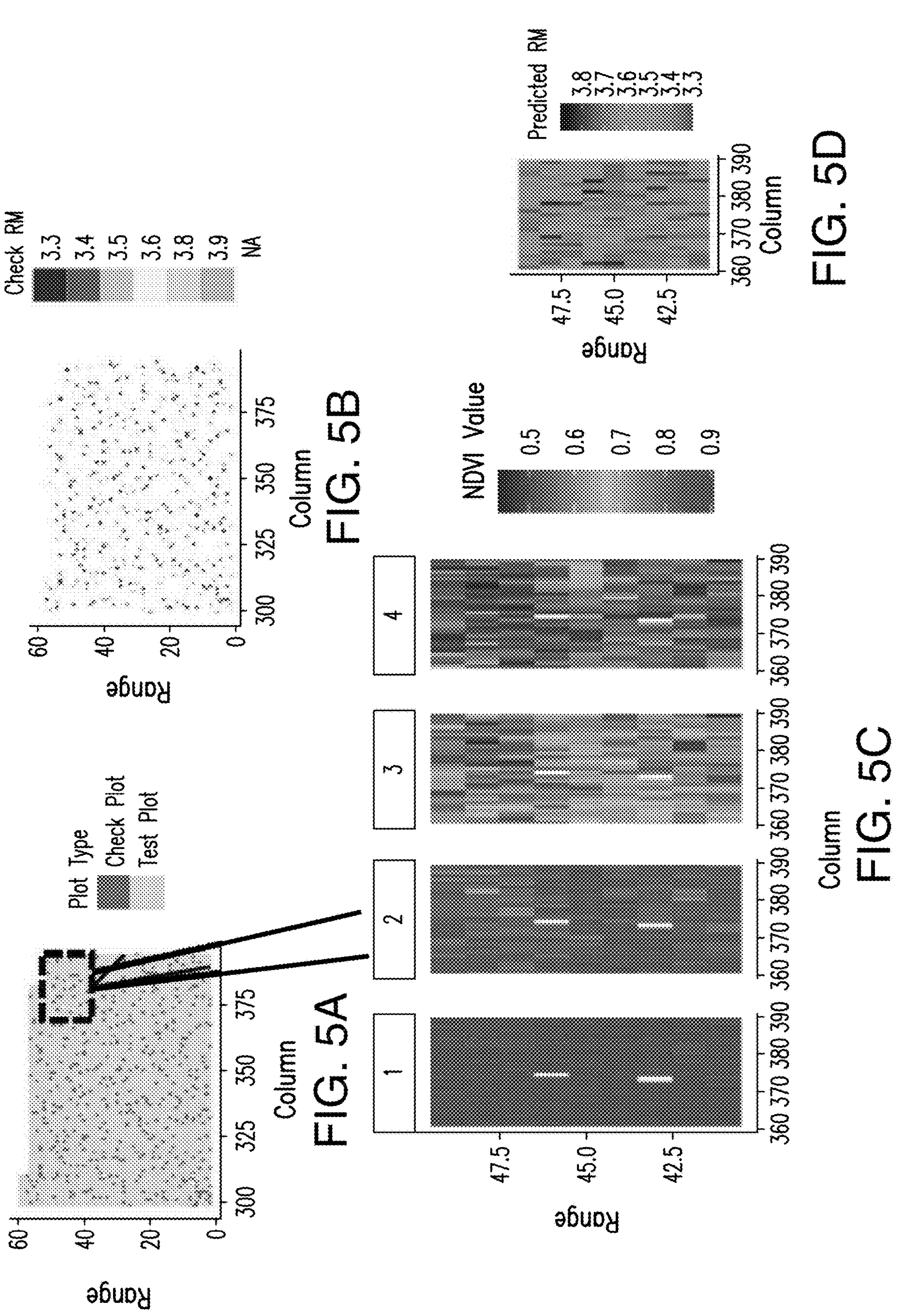

The method 400 is further illustrated with reference to FIGS. 5A-D, which provide presentations of image and phenotypic data. FIG. 5A, for example, shows one or more fields, where the plots included therein are either: check plots or test plots. As noted above, the check plots include phenotypic data (e.g., based on manual collection of the data, based on prior image analysis, based on historical values, etc.), and the test plots do not. The red/pink dots in FIG. 5A are indicative of the test plots. And, in FIG. 5B, the test plots are represented, by location and color, where the color is indicative of the value of the relative maturity of the crops in the plots at the time the phenotypic data was collected and/or gathered. As for the image data, FIG. 5C illustrates a segment of the image data for the field(s) shown in FIG. 5A, as indicated by the lines. The image data is presented here, like in method 400, but is not required, as NDVI data. What's more, the image data is represented over time, from a time:1, to time:2, to time:3, and to time:4, as shown. In connection therewith, as the illustrated crop progresses from time:1 to time:4, the NDVI values, per plot (as represented by each block of color) decrease in this example.

With that said, the model described above in the method 400, for example, may be trained on the data illustrated in FIGS. 5B-C, whereby the model is generated to predict the relative maturity of a crop based on the NDVI data for the plot over time. Then, once the model is generated, input image data is provided to the model, whereupon the predicted relative maturity (RM) for the plots is determined and represented in FIG. 5D.

To that end, in the illustrated embodiment the model generated is generally specific to a given field, where the field may include multiple test plots and multiple check plots (e.g., tens, hundreds, thousands, etc. of each). As such, each different field in the system 100 (e.g., field 106*a*, field 106*b*, etc.), for example, may be associated with (may be assigned, etc.) a different model, and may contain potentially one or more different combinations of genetics in the test and check plots thereof (as well as, potentially, different growing environments, etc.). So, for each unique field, a unique model is trained using the time series spectral data and known response variable phenotype (e.g., in the current example R, G, B, NIR, and NDVI for spectral data and RM for the response variable phenotype, etc.) for all check plots as inputs. Because the checks plots are repeated plots of just a few established genotypes, and the relative phenotype of the check plots is known and stable based on years of prior phenotyping, the resulting model may be successfully and accurately used/trained to predict on the test plots, which may represent a more diverse batch of genetics, replicated few times or even only once within the field, where the phenotype is not yet well established (with the same model then used to predict on all test plots in that field). Stated another way, the model generally trains against repeated checks with a range of well-known phenotypic characteristics. Check patterns are then compared to each test plot's pattern, producing a per plot categorization. In the example embodiment of the system 100 and method 400, measurement series visually portrays how each plot has changed over time with respect to just one of the modeled input attributes.

Then, after training of the model, and determining, in this embodiment, the confidence interval(s), when new images of plots are received by the computing device 102, the computing device 102 may prepare the data for the images, consistent with the above (except excluding phenotypic data), and provide the data set indicative of the images to the trained model. The computing device 102 then forecasts, by use of the model (including, specifically, the weights determined during the training process), the phenotypic data for the plot based on the images of the plot.

Figure 6A:
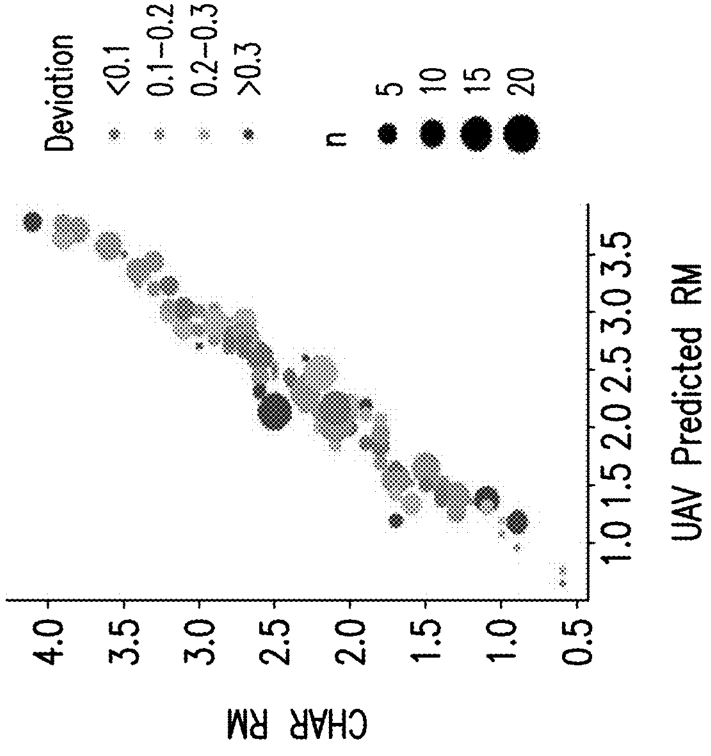
Figure 6B:
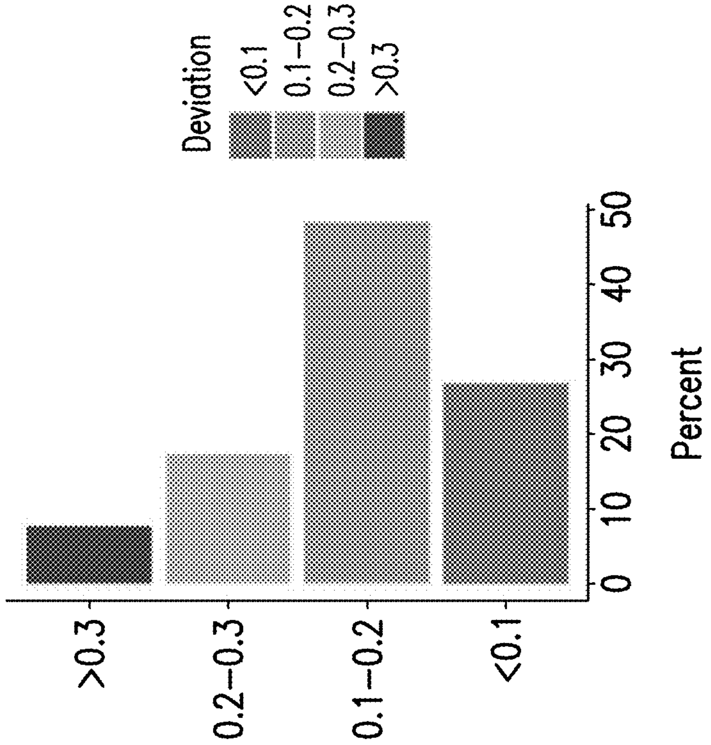

The forecasted or predicted phenotypic data is further validated against manual data collected for various test fields. For example, for maturity checks with known relative maturity values (referred to as "CHAR RM"), the computing device 102 compares the values to model outputs. As shown in FIG. 6A, for example, the CHAR RM values are established through multiple years and locations of field observations. Predictions consistent with the above model (e.g., based on UAV images, etc.) are then determined across multiple locations in a given year and the arithmetic mean is recorded on an individual check basis (referred to as "UAV Predicted RM"). Correlation between predicted RM from UAV and CHAR RM was evaluated, along with computing absolution deviation between CHAR RM and UAV Predicted RM. The model was trained, as described herein, and performed such that about 90% of the correlations provided ≤0.3 abs deviation error, as shown in FIG. 6B.

Figure 6D:
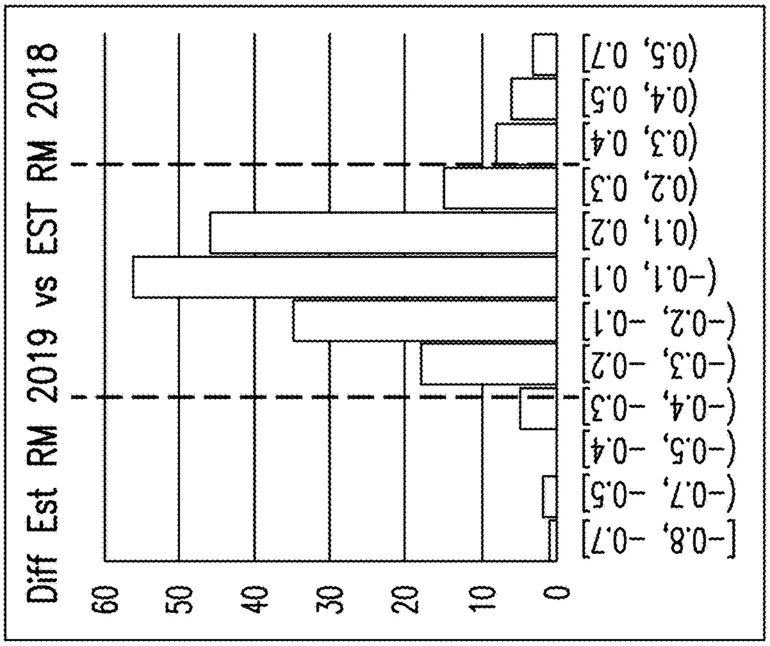
Figure 6C:
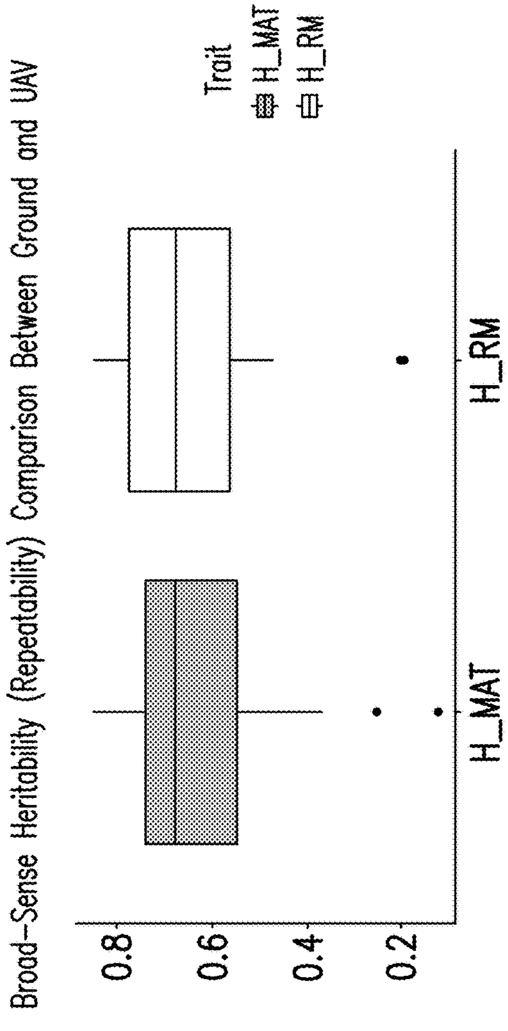

In addition, as to validation of the forecasted phenotypic data, FIGS. 6C-6D illustrate the comparison between human collected phenotypic data as compared to forecasted phenotypic data. In particular, for certain fields in the growing years 2018 and 2019, for which UAV images and human collected phenotypic data—or RM in this example—is known, a model was trained consistent with the above based on a training data set of the available data for 2018 and 2019. The non-training data set was then provided to the trained model in the manner described above. FIG. 6C shows the deviations of the collected data versus the data modeled according the trained model. As shown, a majority of the deviations are less than or equal to ±0.3.

It should be appreciated that the method 400 may be repeated, as necessary or desired, to re-train or continue to train the model at step 428, as additional image and/or phenotypic data is available for the plots and/or fields. The re-training or updated training may be repeated at various intervals as necessary or desired to achieve a specific and/or improved confidence interval. What's more the method 400 may be repeated for different phenotypic data, beyond, for example, relative maturity, for the plots and/or fields, whereby multiple models may be generated, as a given time for a plot or group of plots, etc. In addition to the different phenotypic data, the method 400 may be repeated, additionally or alternatively, for different expressions of the image data, for example, beyond NDVI, etc.

In view of the above, the systems and method herein provide for training a model to forecast phenotypic data, and forecasting the phenotypic data based on the model. As such, the systems and methods herein may, for example, provide for subjective phenotypic data collection by human, which is limited by subjectivity and/or throughput, to be avoided in favor of the more scalable objective approach and higher accuracy phenotypic data generation techniques herein.

With that said, it should be appreciated that the functions described herein, in some embodiments, may be described in computer executable instructions stored on a computer readable media, and executable by one or more processors. The computer readable media is a non-transitory computer readable media. By way of example, and not limitation, such computer readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques, including computer software, firmware, hardware or any combination or subset thereof, wherein the technical effect may be achieved by performing at least one of the following operations: (a) accessing a data set, the data set including images associated with one or more plots, the images having a spatial resolution of about one inch per pixel; (b) for each plot: (i) comparing a first normalized difference vegetation index (NDVI) value of a first image of the plot at time n from the data set to a second NDVI value of a second image of the plot at time n+1 from the data set; (ii) in response to the second NDVI value being greater than the first NDVI value, flagging the second image; and (iii) modifying the data set by removing at least part of the second image, based on the second image being flagged, from the data set; (c) accessing phenotypic data for the one or more plots, at a time consistent with the images associated with the one or more plots; (d) training a model, based on data including the modified data set, for the one or more plots, and the accessed phenotypic data, whereby weights of the model are fitted to said data; (e) storing the trained model in memory; (f) preparing the modified data set as a series of feature vectors having a length of at least m*n, where m is a number of spectral values included in each of said images in the modified data set, and n is number of image dates which includes said images for the one or more plots in the modified data set; (g) generating, via the model, phenotypic data for a crop planted in at least one of the one or more plots; (h) calculating a confidence interval for the model based on the generated phenotypic data for the crop planted in the at least one of the one or more plots; and (i) storing the calculated confidence interval in the memory in association with the model.

Examples and embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more example embodiments disclosed herein may provide all or none of the above mentioned advantages and improvements and still fall within the scope of the present disclosure.

Specific values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may also be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3,3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "in communication with," or "included with" another element or layer, it may be directly on, engaged, connected or coupled to, or associated or in communication or included with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in processing image data associated with one or more plots, the method comprising:

accessing, by a computing device, a data set, the data set including images associated with one or more plots, the images having a spatial resolution of better than or equal to one foot by one foot per pixel;

for each of the one or more plots:

comparing, by the computing device, for each pixel in the images, a first normalized difference vegetation index (NDVI) value of a first image of the plot at time n from the data set to a second NDVI value of a second image of the plot at time n+1 from the data set;

determining, by the computing device, differences of the second NDVI values relative to the first NDVI values;

in response to a first threshold percentage of the differences being positive, flagging, by the computing device, at least part of the second image as bad data; and modifying, by the computing device, the data set by removing the at least part of the second image, based on the second image being flagged as bad data, from the data set;

preparing the modified data set as a series of feature vectors having a length of at least m*n, where m is a number of spectral values included in each of said images in the modified data set, and n is a number of image dates which includes said images for the one or more plots in the modified data set, the spectral values including spectral color data from said images and NDVI values, and wherein the feature vectors further include at least one of the differences of the second NDVI values relative to the first NDVI values;

accessing phenotypic data for a crop included in the one or more plots, at a time consistent with the images associated with the one or more plots, the phenotypic data including relative maturity;

training a model, based on data including the series of feature vectors for the one or more plots, and the accessed phenotypic data, to identify relative maturity of a target crop in a target plot from images of the target plot, whereby weights of the model are fitted to said data; and storing, by the computing device, the trained model in memory.

2. The computer-implemented method of claim 1, wherein comparing the first NDVI value of the first image of the plot at time n to the second NDVI value of the second image of the plot at time n+1 includes comparing each NDVI value of the first image to corresponding NDVI values of the second image, where the NDVI values correspond based on a corresponding location in the plot; and wherein flagging the second image in response to the second NDVI value being greater than the first NDVI value includes flagging the second image in response to each NDVI value of the second image being greater than each corresponding NDVI value of the first image.

3. The computer-implemented method of claim 1, wherein the model is one of: a random forest algorithm and a boosting algorithm.

4. The computer-implemented method of claim 1, wherein the series of feature vectors further includes a NDVI delta, wherein the NDVI delta includes a difference between the NDVI values of consecutive images in the data set.

5. The computer-implemented method of claim 1, further comprising forecasting phenotypic data for a plot based on the trained model.

6. The computer-implemented method of claim 1, further comprising generating, via the model, phenotypic data for the crop planted in at least one of the one or more plots.

7. The computer-implemented method of claim 6, further comprising:

calculating, by the computing device, a confidence interval for the model based on the generated phenotypic data for the crop planted in the at least one of the one or more plots; and storing, by the computing device, the calculated confidence interval in the memory in association with the model.

8. A system for use in processing image data associated with one or more plots, the system comprising a computing device including a processor, which is configured, by executable instructions, to:

access a data set, the data set including images associated with one or more plots, the images having a spatial resolution of better than or equal to one foot by one foot per pixel;

for each of the one or more plots:

compare, for each pixel in the images, a first normalized difference vegetation index (NDVI) value of a first image of the plot at time n from the data set to a second NDVI value of a second image of the plot at time n+1 from the data set;

determine differences of the second NDVI values relative to the first NDVI values;

in response to a first threshold percentage of the differences being positive, flag at least part of the second image; and modify the data set by removing the at least part of the second image, based on the second image being flagged, from the data set;

prepare the modified data set as a series of feature vectors having a length of at least m*n, where m is a number of spectral values included in each of said images in the modified data set, and n is number of image dates which includes said images for the one or more plots in the modified data set, the spectral values including spectral color data from said images and NDVI values;

access phenotypic data for a crop included in the one or more plots, at a time consistent with the images associated with the one or more plots, the phenotypic data including relative maturity;

train a model, based on data including the series of feature vectors for the one or more plots, and the accessed phenotypic data, to identify relative maturity of a target crop in a target plot from images of the target plot, whereby weights of the model are fitted to said data; and store the trained model in memory.

9. The system of claim 8, wherein the computing device is configured, in order to compare the first NDVI value of the first image of the plot at time n to the second NDVI value of the second image of the plot at time n+1, to compare each NDVI value of the first image to corresponding NDVI values of the second image, where the NDVI values correspond based on a corresponding location in the plot; and wherein the computing device is configured, in order to flag the second image in response to the second NDVI value being greater than the first NDVI value, to flag the second image in response to each NDVI value of the second image being greater than each corresponding NDVI value of the first image.

10. The system of claim 8, wherein the model is one of: a random forest algorithm and a boosting algorithm.

11. The system of claim 8, wherein the series of feature vectors further includes a NDVI delta, wherein the NDVI delta includes a difference between the NDVI values of consecutive images in the data set.

12. The system of claim 8, wherein the computing device is further configured to forecast phenotypic data for a plot based on the trained model.

13. The system of claim 8, wherein the computing device is further configured to generate, via the model, phenotypic data for the crop planted in at least one of the one or more plots.

14. The system of claim 8, wherein the computing device is further configured to:

calculate a confidence interval for the model based on the generated phenotypic data for the crop planted in the at least one of the one or more plots; and store the calculated confidence interval in the memory in association with the model.

15. A non-transitory computer-readable storage medium including executable instructions for processing image data, which when executed by at least one processor, cause the at least one processor to:

access a data set, the data set including images associated with one or more plots, the images having a spatial resolution of better than or equal to one foot by one foot per pixel;

for each of the one or more plots:

compare, for each pixel in the images, a first normalized difference vegetation index (NDVI) value of a first image of the plot at time n from the data set to a second NDVI value of a second image of the plot at time n+1 from the data set;

determine differences of the second NDVI values relative to the first NDVI values;

in response to a first threshold percentage of the differences being positive, flag at least part of the second image; and modify the data set by removing the at least part of the second image, based on the second image being flagged, from the data set;

prepare the modified data set as a series of feature vectors having a length of at least m*n, where m is a number of spectral values included in each of said images in the modified data set, and n is number of image dates which includes said images for the one or more plots in the modified data set, the spectral values including spectral color data from said images and NDVI values;

access phenotypic data for a crop included in the one or more plots, at a time consistent with the images associated with the one or more plots, the phenotypic data including relative maturity;

train a model, based on data including the series of feature vectors for the one or more plots, and the accessed phenotypic data, to identify relative maturity of a target crop in a target plot from images of the target plot, whereby weights of the model are fitted to said data; and store the trained model in memory.

* * * * *